United States Patent
Staton et al.

(10) Patent No.: US 11,407,295 B2
(45) Date of Patent: Aug. 9, 2022

(54) DUAL DUROMETER ADHESIVE DAMPING SYSTEMS AND METHODS

(71) Applicant: NEWTONOID TECHNOLOGIES, L.L.C., Liberty, MO (US)

(72) Inventors: Fielding B. Staton, Liberty, MO (US); David Strumpf, Columbia, MO (US)

(73) Assignee: Newtonoid Technologies, L.L.C., Liberty, MO (US)

( * ) Notice: Subject to any disclaimer, the term of this patent is extended or adjusted under 35 U.S.C. 154(b) by 0 days.

(21) Appl. No.: 16/570,856

(22) Filed: Sep. 13, 2019

(65) Prior Publication Data

US 2020/0086726 A1    Mar. 19, 2020

Related U.S. Application Data

(60) Provisional application No. 62/730,763, filed on Sep. 13, 2018.

(51) Int. Cl.

| | |
|---|---|
| *B60J 10/50* | (2016.01) |
| *B32B 7/14* | (2006.01) |
| *B32B 3/18* | (2006.01) |
| *B60J 10/70* | (2016.01) |
| *E06B 5/10* | (2006.01) |
| *G01L 5/00* | (2006.01) |
| *B60J 10/34* | (2016.01) |

(52) U.S. Cl.
CPC ............... *B60J 10/50* (2016.02); *B32B 3/18* (2013.01); *B32B 7/14* (2013.01); *B60J 10/34* (2016.02); *B60J 10/70* (2016.02); *E06B 5/10* (2013.01); *G01L 5/0052* (2013.01); *B32B 2307/56* (2013.01); *B32B 2605/00* (2013.01)

(58) Field of Classification Search
CPC .. B60J 10/50; B60J 10/70; B60J 10/34; B32B 7/14; B32B 3/18; B32B 2605/00; B32B 2307/56; E06B 5/10; G01L 5/0052
See application file for complete search history.

(56) References Cited

U.S. PATENT DOCUMENTS

| | | | | |
|---|---|---|---|---|
| 3,881,290 A | * | 5/1975 | Bouchey | E06B 3/5814 |
| | | | | 52/204.593 |
| 4,897,975 A | * | 2/1990 | Artwick | E06B 3/5821 |
| | | | | 52/208 |

(Continued)

FOREIGN PATENT DOCUMENTS

| | | | | |
|---|---|---|---|---|
| EP | 0967357 A1 | * | 12/1999 | E06B 3/62 |
| JP | 2002114542 A | * | 4/2002 | |

OTHER PUBLICATIONS

PCT Application No. PCT/US2019/051162, International Search Report, dated Nov. 13, 2019, 10 pages.

*Primary Examiner* — Brian D Mattei
*Assistant Examiner* — Omar F Hijaz
(74) *Attorney, Agent, or Firm* — Avek IP, LLC

(57) ABSTRACT

A damping system includes a component for a structure. The component has a first panel with an outer perimeter, a first adhesive disposed about the outer perimeter, a second adhesive disposed along the outer perimeter inward of the first adhesive, and a second panel adhered to the first panel via the first and second adhesives. The first adhesive has a first durometer, and the second adhesive has a second durometer. The first and second adhesives dampen impact forces received upon at least one of the first and second panels.

10 Claims, 1 Drawing Sheet

(56) References Cited

U.S. PATENT DOCUMENTS

| | | | | |
|---|---|---|---|---|
| 5,001,867 A | * | 3/1991 | Dupuy | B60J 5/0416 |
| | | | | 49/502 |
| 5,229,748 A | | 7/1993 | Ehringer | |
| 5,391,416 A | | 2/1995 | Kunert | |
| 9,371,669 B2 | * | 6/2016 | Berg | C09J 9/02 |
| 9,759,286 B1 | * | 9/2017 | Staton | F16F 1/3605 |
| 2002/0194813 A1 | | 12/2002 | Virnelson | |
| 2006/0154005 A1 | | 7/2006 | Misonou | |
| 2011/0265932 A1 | | 11/2011 | Jialanella | |
| 2016/0290033 A1 | | 10/2016 | Messere | |

\* cited by examiner

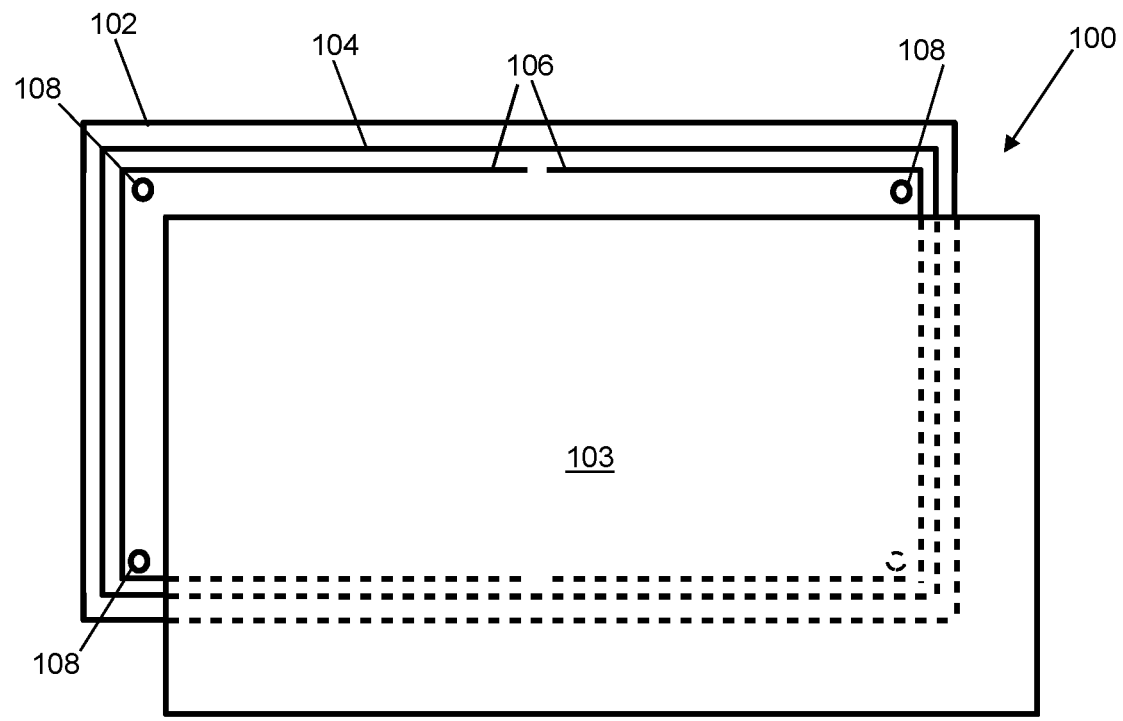

DUAL DUROMETER ADHESIVE DAMPING SYSTEMS AND METHODS

CROSS-REFERENCE TO RELATED APPLICATIONS

This application claims priority to U.S. Provisional Patent Application No. 62/730,763, filed Sep. 13, 2018, the disclosure of which is incorporated by reference herein in its entirety.

BACKGROUND

Pursuant to the American National Standards Institute, the Auto Glass Safety Council sets and maintains the standards for automotive window installation and repair. These standards address critical areas relative to glass installation in automobiles, including installation standards for adhesive bonded glass. Adherence to these installation standards are of vital importance, as the proper installation methods prevent premature failure of the windows to the extent that such failures can be avoided. Among these standards includes best practices for the selection of adhesives used to bond the windshield to the vehicle frame.

In a proper installation, windows, and specifically windshields, are typically secured into place at the window frame with a urethane adhesive. Urethane is applied to the frame and/or the window, and the window is set in place. The urethane must then cure in order to create a seal between the window and the frame. Urethane has several appealing characteristics that make it an ideal adhesive for window applications. Namely, urethane is an elastomer, or a polymer exhibiting elastic properties. Elastomers are amorphous polymers that are maintained above their glass transition temperature such that molecular reconfirmation is possible without breaking covalent bonds. In other words, urethanes are generally soft and deformable at ambient temperatures. Because urethane exhibits such elastic properties, when used as an adhesive and seal for automotive windshields, the urethane may additionally act as a damping element.

While urethane does enhance the damping characteristics of the window, its effects are limited due to the environmental limitations created as a result of being pinched between the window and the frame. Accordingly, the damping benefits of the urethane are rarely realized. This is easily evidenced by the thousands of windshields that must be repaired and/or replaced every year. A window having improved damping capabilities is desirable.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In one embodiment, a damping system includes a component for a structure. The component has a first panel with an outer perimeter, a first adhesive disposed about the outer perimeter, a second adhesive disposed along the outer perimeter inward of the first adhesive, and a second panel adhered to the first panel via the first and second adhesives. The first adhesive has a first durometer, and the second adhesive has a second durometer. The first and second adhesives dampen impact forces received upon at least one of the first and second panels.

In another embodiment, a window damping system has a window frame surrounding a window. The window has an outer perimeter, and a first adhesive disposed along the outer perimeter. A second adhesive is also disposed along the outer perimeter, inward of the first adhesive. The first adhesive has a first durometer, and the second adhesive has a second durometer and a plurality of three-dimensional particles dispersed therein. The window is adhered to the window frame via the first and second adhesives.

In still another embodiment, a damping system includes a component for a structure. The component has a first panel having an outer perimeter. A first adhesive is disposed about the outer perimeter. A second adhesive is also disposed along the outer perimeter, inward of the first adhesive. A second panel adhered to the first panel via the first and second adhesives. The first adhesive has a first durometer, and the second adhesive has a second durometer such that the first and second adhesives dampen impact forces received upon at least one of the first and second panels. The system further includes at least one sensor disposed at one of the first panel and the second panel.

BRIEF DESCRIPTION OF THE DRAWINGS

Illustrative embodiments of the invention are described in detail below with reference to the attached FIGURE, illustrating a dual durometer window system.

WRITTEN DESCRIPTION

Disclosed herein are embodiments of dual-durometer sealant systems that may increase the damping response of a layer of material, such as sheet metal, glass, wood, etc. incorporated as a component of any structure, including but not limited to buildings, vehicles, windows, doors, bridges, televisions, computers, or any other structure. Further benefits of the dual-durometer sealant system will become apparent from the disclosure provided herein.

According to one embodiment of the invention, illustrated in the FIGURE, a dual durometer system 100 includes a layer of material 102 which is adhered to a second layer of material 103 (e.g., a frame) with an adhesive 104 having a first durometer. The adhesive 104 may be a urethane adhesive having a durometer ranging from 10 to 95 on the Shore A scale. In embodiments, the durometer of the urethane adhesive 104 is dependent on the curing time. The urethane adhesive 104 may optionally be a urethane adhesive that is heretofore preapproved for use in the installation of certain types of materials. For example, certain urethane adhesives are preapproved for use in the installation of automotive windshields, and may therefore be used as the adhesive 104 where the layer of material 102 is glass for an automotive windshield. In other embodiments, an alternative urethane adhesive may be utilized, and may be dependent on the particular material used for the layer 102 and the planned application of the layer 102.

As noted briefly above, the adhesive 104 may provide some nominal damping benefits to the system 100. Depending on the durometer of the adhesive 104, the adhesive 104 may help to deflect impact forces, which may result from physical encounters with objects such as rocks, or environmental forces such as wind or even sound waves, or any other type of encounter experienced by systems. However, the force received by the layer 102 for each type of encounter, and indeed each encounter itself, is unique. Therefore, the adhesive 104, by itself, is unlikely to provide sufficient damping benefits for each type of encounter. For example, in an automotive windshield, the adhesive 104 may be flexible enough to prevent cracking of the window due to encounters with small rocks or when traveling at low speeds, but is insufficient for encounters with larger rocks, or when the vehicle is traveling at high speeds. Moreover, the adhesive 104 may provide some sound damping benefits. But such benefits may be relatively limited, and outside noise may still enter into the vehicle. Similar issues may likewise exist with other structures.

The system 100 may therefore include a second adhesive 106 having a second durometer. In an embodiment, the adhesive 106 may be a urethane adhesive similar to adhesive 104. In another embodiment, the adhesive 106 is not a urethane adhesive. The durometer of the second adhesive may likewise be in the range of 10 to 90 on the Shore A scale. Preferably, the durometer of the adhesive 106 is not the same as the durometer of the adhesive 104. In this way, impact forces by multiple types of encounters can be mitigated. For example, an adhesive having a durometer of 40 on the Shore A scale may be effective to dampen certain encounters, such as small physical encounters and/or certain sound waves, while an adhesive having a durometer of 10 on the Shore A scale may be effective to dampen certain other encounters, such as larger physical encounters and/or certain other sound waves. Those of skill in the art will therefore understand that incorporating dual durometer adhesives into the system 100 may increase the damping capabilities of the system 100, which may lead to a more pleasant user experience (especially in the case of improved sound damping) and prolonged life of the panel 102.

In embodiments, the adhesive 106 may be tunable in response to forces received upon the windshield. Nonlimiting examples of adhesives having such capabilities are described in U.S. patent application Ser. No. 15/365,923 (now U.S. Pat. No. 9,759,286), Ser. No. 15/678,392 (now U.S. Pat. No. 10,088,011), and Ser. No. 16/116,646, each of which is incorporated by reference herein in its entirety and forms part of this disclosure. As described in the '923, the '392, and the '646 applications, the adhesive may have a plurality of damping apparatus dispersed therein. The damping apparatus may come in a variety of different configurations. In one embodiment, the damping apparatus are three-dimensional structures that flex (e.g. dynamically compress or expand) upon contact with an impact force. In addition to the flexible nature of the three-dimensional structures, the structures may be tunable in response to the impact forces. The adhesive 106 may thus adapt to changing circumstances by altering the characteristics of the three-dimensional damping apparatus which ultimately may change the overall durometer of the adhesive 106. The three-dimensional damping apparatus may respond to vibrational, thermal, optical, magnetic, electromagnetic, electric, and/or other types of signals which alter the characteristics of the damping apparatus, such as the flexibility of the damping apparatus. Variations in the pliable nature of the overall dual durometer adhesive system may be realized through the use of a plurality of areas of second adhesive 106, such as by forming multiple beads in concentric annular rings around a perimeter of, or covering, the layer 102. Alternately, an array of beads or dots may form a contiguous array of varying adhesive 104 and second adhesive 106 patterns in a line or curve. Strategic patterns (e.g. geometric shapes/fractals) of varying flexibility and durometer may be used to attenuate undesirable frequency amplitudes (e.g. fundamental frequencies, $3^{rd}$ harmonic frequencies, $5^{th}$ harmonic frequencies, etc.). The net result of the strategic pattern is to move energy peaks over distance and time in order to reduce the damaging or undesirable forces that could lead to breakage or undesirable vibration. Functional strategic patterns in some embodiments may operate collectively as a composite set of all durometers and may function as a composite wave guide to propagate energy in a strategic directional path or avoid impact waveform reflections. Some embodiments may exploit dual durometer patterns to provide impedance matching of impact frequencies with the adhesive composite structure. It is important to note that dual durometer adhesive embodiments may incorporate more than two durometers and dimensional structures of adhesive and is therefore not limited to two durometer embodiments.

One or more sensors 108 may be disposed on or near the layer 102. The sensors(s) 108 may determine the force of the impacts occurring at or near the layer 102. Once the sensor(s) 108 determine(s) the force of the impacts, the sensor(s) 108 may, in conjunction with a processor and the required circuitry and electronics (whether now known or later developed), activate a signal to alter the characteristics of the adhesive as described above. For example, for a window in a hailstorm, the sensors 108 may determine an increase in forces received by the window 102. Upon determination of the increase in forces, a signal may be sent to the adhesive 104 and/or 106 (e.g., the adhesive having damping apparatus) causing the damping apparatus to, for example, realign, or otherwise be adjusted so as to compensate for the higher forces upon the window 102 without allowing the window 102 to break. The sensors 108 may be used to acquire static or dynamic information and may additionally function as transducers allowing output actuation as a dynamic controlled response (e.g. microphone sensor, vibration canceling piezo polymers, nitinol strands, carbon nanotubes, graphene lattice grids, et cetera).

Of course, the adhesive 104 and/or 106 may not include damping apparatus. In some embodiments, the durometer of the adhesive 104 and/or 106 may be influenced by heat or cold, for example. Here, the sensors 108 may be in operable communication with one or more heating or cooling elements for heating or cooling the adhesive 104 and/or 106. For example, a wire or ribbon metallic resistance heating element (e.g., nichrome, kanthal, cupronickel, etched foil, carbon structures, etc.) may be laid together with the adhesive 104 and/or 106. Electrical current may selectively flow through the resistance heating element to heat the adhesive 104 and/or 106 to influence the durometer of the adhesive 104 and/or 106. In embodiments, the adhesive 104 and/or 106 is a PTC rubber, such as that disclosed in U.S. Pat. No. 6,734,250. As is known in the art, PTC rubber is configured to self-regulate its temperature based on the objects to which it is attached, and the thermal environment in which it is located. According to some embodiments, the PTC rubber may be used as a heat transfer sensor for determining the heat transfer between the layer of material 102 and the object or layer to which it is attached. In still further embodiments, the adhesive 104 and/or 106 includes one or more Peltier devices in electrical connection with an electrical energy source for heating and/or cooling the adhesive 104 and/or 106.

The sensor(s) 108 may monitor any impact upon the layer 102. While the impacts may of course be physical (e.g., able to be perceived by touch), for purposes of the invention "impacts" may also include encounters that are non-physical or semi-physical, such as impacts from light waves, sound waves, radio waves, and/or any other type of electromagnetic radiation, particle radiation, acoustic radiation, and gravitational radiation. The sensor(s) 108 may activate a signal to alter the adhesive 104 and/or 106 to reduce the transmission of the impacts through the layer 102. In an embodiment, wave cancellation methods may be utilized for reducing the unwanted transmission of waves. For example, a noise cancellation speaker positioned at or near the layer 102 may emit a sound wave having the same amplitude as the sound waves of the outside noise as determined by the sensor(s) 108, but with an inverted phase. In another embodiment, the signal may cause the damping apparatus (where present) to vibrate within the adhesive 104 and/or 106, which may emit a responsive sound wave. The intensity of the vibrations of the damping apparatus may directly correlate to the amplitude of the emitted sound wave.

In further embodiments, the adhesive 104 and/or 106 may be separated into sections. The sections may but need not be contiguous. The sections may each have the same composition, or different compositions of adhesive may be utilized. In any event, the sections may be independently controllable to compensate for multiple impact forces at one time. For example, one section (or more than one, if necessary), may be tuned in response to a first detected impact upon the layer 102. Another section (or more than one, if necessary), may be tuned in response to a second detected impact upon the layer 102. Still another section (or sections, as the case may be) may be tuned in response to still another impact force. It shall be understood that the sections may, in embodiments, be configured as additional rings of adhesive around the perimeter of the layer 102.

Importantly, in some embodiments, the adhesive 104 may remain unchanged from the traditional urethane adhesives used to date. The methods of installing the adhesive 104 and the respective layer 102 may likewise remain the same. This ensures that the current, or future, established best practices are still followed during installation of the layer 102.

According to embodiments of the invention, a method of installing the system 100 includes placing the adhesive 104 around an outer perimeter of the panel 102, as shown in the FIGURE. The adhesive 104 may, but need not be, placed around the outer perimeter such that it forms a tight seal between the first layer 102 and the second layer 103, as is known in the art. The adhesive 106 may be applied to the layer 102 (or 103) inward of the adhesive 104. Preferably, when the layer 102 is a window, the adhesive 104 and the adhesive 106 are positioned at the perimeter such that they are unseen by a viewer when the window 102 is in place in the window frame. Once the adhesives 104 and 106 are in place, the first layer 102 is joined with the second layer 103, and the adhesives 104 and 106 are allowed to cure as required.

While the description herein is directed to windshields for automobiles, it shall be understood that windows and window frames for homes, buildings, and other structures may also utilize the adhesives 104 and 106 to provide enhanced damping capabilities to the windows. Additionally, building materials such as sheetrock, metals, ceramics, wood, engineered wood products, home siding, automotive panels, brake pads, door seals and motors may incorporate the same techniques as described herein.

Many different arrangements of the described invention are possible without departing from the spirit and scope of the present invention. Embodiments of the present invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the present invention. Further, it will be understood that certain features and subcombinations are of utility and may be employed without reference to other features and subcombinations and are contemplated within the scope of the disclosure and the claims. Not all steps listed in the description and various FIGURES need to be carried out in the specific order described. The description should not be restricted to the specific described embodiments.

The invention claimed is:

1. A damping system, comprising a component for a structure, the component consisting of:
   a first panel having an outer perimeter;
   a second panel having an outer perimeter;
   a first adhesive disposed about the outer perimeter of the first panel, the first adhesive having a first durometer hardness;
   a second adhesive disposed along the outer perimeter of the second panel inward of and spatially separated from the first adhesive, the second adhesive having a second durometer hardness; and
   a sensor disposed at one of the first panel and the second panel;
   wherein:
      the first and second adhesives secure the first panel to the second panel and dampen impact forces received upon at least one of the first and second panels;
      the sensor detects the strength of the impact forces received upon the component;
      the second durometer hardness of the second adhesive is tunable in response to the detected strength of the impact forces;
      the second adhesive comprises at least two sections;
      the impact forces comprise a first impact force and a second impact force;
      a first section of the second adhesive is tunable in response to the first impact force; and
      a second section of the second adhesive is tunable in response to the second impact force.

2. The system of claim 1, wherein the first and second durometer hardnesses are not equal.

3. The system of claim 2, wherein the first and second durometer hardnesses are each independently in the range of 10 to 90 on the Shore A scale.

4. The system of claim 1, wherein the second adhesive comprises a plurality of three-dimensional damping apparatus dispersed therein, and wherein the damping apparatus are tunable in response to a respective impact force received upon at least one of the first and second panels.

5. The system of claim 4, wherein the three-dimensional damping apparatus are nano-particles.

6. The system of claim 5, wherein the nano-particles are nanotubes.

7. The system of claim 4, wherein the three-dimensional damping apparatus are micro-particles.

8. The system of claim 1, further comprising a force generating device, wherein the force generating device initiates an applied force to at least one of the first and second panels, the applied force being dependent on the detected strength of the impact forces.

9. The system of claim 1, wherein the impact forces are at least one of a sound wave, an electromagnetic wave, a seismic wave, a change in temperature, a change in atmospheric pressure, and a physical force.

10. The system of claim 1, wherein:
the first panel is a window frame; and
the second panel is a window.

\* \* \* \* \*